(12) United States Patent
Davies et al.

(10) Patent No.: US 6,497,054 B2
(45) Date of Patent: Dec. 24, 2002

(54) UPGRADING SOLID MATERIAL

(75) Inventors: Mark Howard Davies, Canning Vale (AU); Jonathan James Davis, Chapel Hill (AU); Jared Michael Osborne, Hirstbridge (AU)

(73) Assignee: Technological Resources Pty. Ltd., Melbourne (AU)

( * ) Notice: Subject to any disclaimer, the term of this patent is extended or adjusted under 35 U.S.C. 154(b) by 0 days.

(21) Appl. No.: 09/964,309

(22) Filed: Sep. 26, 2001

(65) Prior Publication Data

US 2002/0079273 A1 Jun. 27, 2002

(30) Foreign Application Priority Data

Sep. 26, 2000 (AU) .............................. PR0373
Mar. 13, 2001 (AU) .............................. PR3680

(51) Int. Cl.[7] .................................................. F26B 3/00
(52) U.S. Cl. ........................... 34/413; 34/362; 34/402
(58) Field of Search ........................ 34/362, 402, 413; 44/620, 628

(56) References Cited

U.S. PATENT DOCUMENTS

| 1,473,641 A | 11/1923 | Pohl |
| 1,632,829 A | 6/1927 | Fleissner |
| 1,679,078 A | 7/1928 | Fleissner |
| 1,965,513 A | * 7/1934 | Ruzicka ............................ 34/24 |
| 2,811,427 A | 10/1957 | Lykken ............................ 44/20 |
| 3,197,415 A | * 7/1965 | Hnedrix ........................ 252/411 |
| 3,558,111 A | 1/1971 | Avery ............................ 263/21 |

(List continued on next page.)

FOREIGN PATENT DOCUMENTS

| GB | 2 067 732 | 7/1981 | ............ F26B/21/10 |
| WO | 98/30856 | 7/1998 | ............ F28D/9/00 |
| WO | 98/39613 | 9/1998 | ............ F28F/13/00 |
| WO | 98/42427 | 10/1998 | ............ B01D/43/00 |
| WO | 98/50743 | 11/1998 | ............ F26B/3/06 |
| WO | 98/59209 | 12/1998 | ............ F28D/13/00 |
| WO | 99/10078 | 3/1999 | ............ B01D/43/00 |
| WO | 99/10079 | 3/1999 | ............ B01D/43/00 |
| WO | 99/50609 | 10/1999 | ............ F28F/9/26 |

*Primary Examiner*—Ira S. Lazarus
*Assistant Examiner*—K. B. Rinehart
(74) *Attorney, Agent, or Firm*—Whyte Hirschboeck Dudek SC (57) ABSTRACT

Solid material, e.g., coal, is upgraded, e.g., the water content reduced and the BTU value increased, by a method comprising the steps of:

(a) supplying the solid material to a reactor;
(b) heating the solid material in the reactor under water saturation pressure conditions and removing water from the solid material; and
(c) cooling the solid material by depressurising the solid material under water saturation conditions.

45 Claims, 1 Drawing Sheet

U.S. PATENT DOCUMENTS

| | | | |
|---|---|---|---|
| 3,765,102 A | 10/1973 | Fischer | 34/136 |
| 3,814,172 A | 6/1974 | Shore | 165/12 |
| 4,052,168 A | 10/1977 | Koppelman | 44/1 |
| 4,069,107 A | 1/1978 | Koppelman et al. | 201/12 |
| 4,106,999 A | 8/1978 | Koppelman et al. | 202/118 |
| 4,127,391 A | 11/1978 | Koppelman | 44/51 |
| 4,129,420 A | 12/1978 | Koppelman | 44/51 |
| 4,153,427 A * | 5/1979 | Bissett et al. | 48/86 R |
| 4,249,909 A * | 2/1981 | Comolli | 44/1 |
| 4,259,157 A | 3/1981 | Lorenz et al. | 201/39 |
| 4,285,140 A * | 8/1981 | Vna Raam et al. | 34/15 |
| 4,307,773 A | 12/1981 | Smith | 165/1 |
| 4,339,306 A | 7/1982 | Janusch | 159/15 |
| 4,471,536 A | 9/1984 | Herber et al. | 34/60 |
| 4,477,257 A | 10/1984 | Koppelman et al. | 44/30 |
| 4,502,227 A | 3/1985 | Janusch | 34/12 |
| 4,506,453 A | 3/1985 | Shirley, Jr. et al. | 34/12 |
| 4,514,912 A | 5/1985 | Janusch et al. | 34/37 |
| 4,626,258 A | 12/1986 | Koppelman | 44/2 |
| 4,628,619 A | 12/1986 | Janusch et al. | 34/180 |
| 4,667,416 A | 5/1987 | Hacker et al. | 34/9 |
| 4,674,195 A | 6/1987 | Janusch | 34/8 |
| 4,689,970 A | 9/1987 | Ohguma et al. | 62/514 |
| 4,728,339 A | 3/1988 | Koppelman | 44/1 |
| 4,784,216 A | 11/1988 | Bracegirdle et al. | 165/64 |
| 5,071,447 A | 12/1991 | Koppelman | 44/621 |
| 5,167,274 A | 12/1992 | Mueller | 165/1 |
| 5,290,523 A | 3/1994 | Koppelman | 422/201 |
| 5,320,168 A | 6/1994 | Haight | 165/166 |
| 5,353,517 A | 10/1994 | Weiss | 34/363 |
| 5,396,850 A | 3/1995 | Conochie et al. | 110/346 |
| 5,502,743 A | 3/1996 | Conochie et al. | 373/151 |
| 5,512,217 A | 4/1996 | Batterham et al. | 261/36.1 |
| 5,526,582 A | 6/1996 | Isaksson | 34/476 |
| 5,640,708 A | 6/1997 | Conochie et al. | 588/201 |
| 5,659,974 A | 8/1997 | Graeff | 34/378 |
| 5,746,787 A | 5/1998 | Koppelman | 44/621 |
| 5,769,908 A | 6/1998 | Koppelman | 44/621 |
| 6,101,738 A * | 8/2000 | Gleason | 34/362 |
| 6,185,841 B1 | 2/2001 | Conochie | 34/337 |
| 6,249,989 B1 | 6/2001 | Conochie et al. | 34/337 |
| 6,266,894 B1 | 7/2001 | Conochie | 34/356 |

* cited by examiner

FIGURE 1

UPGRADING SOLID MATERIAL

BACKGROUND OF THE INVENTION

The present invention relates to upgrading a solid material.

The present invention relates particularly, although by no means exclusively, to upgrading solid material which has low thermal conductivity under conditions including elevated pressure and temperature.

The present invention relates more particularly to:
(a) upgrading porous, water-containing, carbonaceous materials (which term includes coal, wood, and biomass) under conditions including elevated pressure and temperature to increase the thermal value of the carbonaceous materials by removing water from the carbonaceous materials; and
(b) cooling the heated carbonaceous materials.

U.S. Pat. No. 5,290,523 to Koppelman discloses a process for upgrading coal by the simultaneous application of pressure and temperature.

Koppelman discloses thermal dewatering of coal by heating coal under conditions including elevated pressure and temperature to cause physical changes in the coal that results in water being removed from the coal by a "squeeze" reaction.

Koppelman discloses maintaining the pressure sufficiently high during the upgrading process so that the by-product water is produced mainly as a liquid rather than as steam.

Koppelman discloses a range of different apparatus options for carrying out the upgrading process.

In general terms, the options are based on the use of a reactor which includes an inverted conical inlet, a cylindrical body, a conical outlet, and an assembly of vertically or horizontally disposed heat exchange tubes positioned in the body.

In one proposal to use a Koppelman-type reactor, the vertically disposed tubes and the outlet end are packed with coal, and nitrogen is injected to pre-pressurise the tubes and the outlet end. The coal is heated by indirect heat exchange with oil that is supplied as a heat transfer fluid to the cylindrical body externally of the tubes. Further heating of the coal is promoted by direct heat exchange between the coal and steam which acts as a working fluid within the packed bed. In addition, the steam pressurises the tubes and the outlet end to a required pressure.

The combination of elevated pressure and temperature conditions in the tubes and the outlet end evaporates some of the water from the coal and thereafter condenses some of the water as a liquid. A portion of the steam generated following the addition of water also condenses as a liquid in colder regions of the tubes due to the elevated pressure. Steam which is not condensed, and which is in excess of the requirements for optimum pressurisation of the packed bed, must be vented. In addition, non-condensable gases (e.g. CO, $CO_2$) are evolved and need to be vented. Periodically, liquid is drained from the outlet end.

Finally, after a prescribed residence time, the reactor is depressurised and the upgraded coal, with virtually no retained water, is discharged via the outlet end and subsequently cooled.

There are a number of engineering issues and ultimately cost considerations that have inhibited commercialisation of the Koppelman process. There are also spontaneous combustion and dust problems associated with the product.

International applications WO98/30856, WO 98/39613, WO 98/42427, WO 98/50743, WO 98/59209, WO 99/10078 and WO 99/10079 in the name of KFx Inc disclose a series of improvements to the Koppelman process.

U.S. Pat. Nos. 1,679,078, 4,514,912, 4,628,619, 4,502,227, 4,339,306, 4,674,195 and 4,471,536 describe the so-called Fleissner process for upgrading coal.

The Fleissner process was invented in the 1920's (U.S. Pat. No. 1,679,078) and was developed further in the 1980's by Voest-Alpine AG (see the other US patents mentioned above). There has been commercial use of the process, mainly in Eastern Europe. The process uses saturated steam to heat batches of coal and removes some water as liquid to avoid a heat of vaporisation penalty. Pressures of 30–60 bar and temperatures of 445–535° F. (230–280° C.) are used, with a batch cycle time of approximately 160 minutes. Additional flash evaporative drying occurs during depressurisation. Batteries of 4–6 autoclaves are generally required to utilise the waste water and steam energy from each batch reactor. Waste water quality is poor and there are odorous emissions that require scrubbing or incineration. The energy required for upgrading is relatively low. However, spontaneous combustion and dust are problems.

SUMMARY OF THE INVENTION

An object of the present invention is to provide an improved method and apparatus for upgrading coal by the simultaneous application of pressure and temperature.

There are two aspects to the present invention.

According to a first aspect of the present invention, in broad terms, there is provided a method for upgrading solid material that includes the steps of:
(a) supplying solid material to a reactor;
(b) heating solid material in the reactor under water saturation pressure conditions and removing water from solid material; and
(c) cooling solid material by depressurising solid material under water saturation conditions.

In more specific terms, the first aspect of the invention provides a method for upgrading solid material that includes the steps of:
(a) supplying solid material to a reactor;
(b) heating solid material in the reactor under water saturation pressure conditions and causing shrinkage of pores of solid material and forcing water from pores as a consequence of pore shrinkage, the water saturation pressure conditions and the heating time being selected so that water is retained in the pores, particularly fine pores, of solid material; and
(c) cooling solid material by depressurising solid material under water saturation conditions and separating water as water vapour from solid material and retaining water in pores, particularly fine pores, of solid material.

The applicant has found that upgraded coal produced by the above-described method of the first aspect of the invention is considerably less likely to spontaneously combust than upgraded coal produced by the above-described known methods and has considerably less dustiness than the known products. In addition, the applicant has found that, unlike the known products, upgraded coal produced by the above-described method can be blended with raw coal without increased risk of spontaneous combustion. Moreover, the applicant has found that both the as-produced upgraded coal and blended product can be stockpiled.

The above-described method of the first aspect of the invention is based to a large extent on the realisation that problems of spontaneous combustion and dust can be significantly alleviated by retaining moisture in pores, particularly fine pores, of solid material.

Heating coal under elevated pressure and temperature conditions causes shrinkage of pores of less than 500 nanometres diameter in coal. Pore shrinkage forces water from pores. The degree of pore shrinkage is highly dependent on coal properties and operating conditions.

In the above-described method of the first aspect of the invention coal is heated under water saturation pressure conditions and is cooled under water saturation conditions. The combination of these heating and cooling conditions and appropriate selection of heating time removes water from pores of coal, and thereby improves the heating value of the coal, but does not remove all the water. The retained water in pores, particularly fine pores, is important because it limits access of oxygen to reactive sites in the pores and thereby reduces the possibility of spontaneous combustion of the coal. In addition, the surface of the product is less hydrophilic than known products and the retained surface water reduces the dustiness of the product.

DESCRIPTION OF THE PREFERRED EMBODIMENT

The term "fine pores" is understood herein to mean pores having a diameter of less than 6 nanometres.

Preferably the above-described method of the first aspect of the invention retains less than 12 wt % water in cooled solid material from step (c).

More preferably the method retains less than 10 wt % water in cooled solid material from step (c).

It is preferred particularly that the method retains less than 8 wt % of water in cooled solid material from step (c).

Preferably the method retains more that 5 wt % water in cooled solid material from step (c).

It is preferred particularly that the method retains more than 6, more preferably more than 7, wt % water in cooled solid material from step (c).

The method of the first aspect of the invention may be operated on a continuous basis, a semi-continuous basis, or a batch basis.

When the method is operated on a continuous or a semi-continuous basis, preferably step (a) includes pressurising solid material and supplying pressurised solid material to the reactor on a continuous or a semi-continuous basis while maintaining the reactor under water saturation pressure conditions.

Preferably step (a) includes pressurising solid material in a lockhopper or other suitable pressuring chamber.

Preferably step (a) includes pressurising solid material in the lockhopper or other suitable pressurising chamber with an external gas supply and/or off-gas from the reactor.

In addition, when the method is operated on a continuous or a semi-continuous basis, preferably step (c) includes removing solid material from the reactor on a continuous or a semi-continuous basis while maintaining the reactor under water saturation pressure conditions and thereafter cooling the solid product as described above.

Preferably step (c) includes cooling solid material to a temperature of less than 230° F. (110° C.).

Preferably step (c) includes cooling solid material by depressurising solid material under water saturation conditions in a lockhopper or other suitable depressuring chamber.

When the method is operated on a batch basis steps (b) and (c) of the heating and cooling solid material can be carried out in the reactor.

The first aspect of the invention also provides an apparatus for upgrading solid material by removing water from solid material under elevated pressure and temperature conditions that includes:

(a) a reactor for holding solid material at elevated pressure and temperature conditions;

(b) a means for heating solid material in the reactor under water saturation pressure conditions, which heating means includes a means for controlling pressure and temperature conditions in the reactor; and (c) a means for cooling solid material by depressurising solid material under water saturation conditions.

Preferably the apparatus includes a means for supplying solid material under pressure to the reactor on a continuous or semi-continuous basis.

Preferably the means for supplying solid material under pressure to the reactor includes a lockhopper.

Preferably the lockhopper is connected to the reactor for supplying pressurised solid material to an upper section of the reactor.

Preferably the means for controlling pressure and temperature conditions in the reactor includes an indirect heat exchange means for heating solid material in the reactor.

Preferably the heat exchange fluid is steam and the indirect heat exchange means includes an assembly of a series of vertical heat exchange tubes, a horizontal manifold connected to upper ends of the tubes, and a horizontal manifold connected to lower ends of the tubes located in the reactor.

Preferably the means for controlling pressure and temperature conditions in the reactor includes a means for minimising pressure fluctuations in the reactor, for example, as solid material is supplied to the reactor.

In one embodiment the means for minimising pressure fluctuations includes an accumulator that holds a pool of liquid at a temperature just below saturation and is in fluid communication with the reactor.

In another, although not the only other embodiment, pressure fluctuations are minimised by connecting at least two reactors in parallel so that a common pressure is maintained in the reactors.

Preferably the means for cooling solid material includes a means for removing solid material from the reactor on a continuous or semi-continuous basis while maintaining water saturation pressure conditions in the reactor.

Preferably the cooling means includes a vent for flash cooling solid material.

Preferably the cooling means includes a lockhopper.

Preferably the lockhopper is connected to the reactor for removing solid material from a lower section of the reactor while maintaining water saturation conditions in the reactor.

The pressurising and depressurising lockhoppers may be pressurised by an external gas supply and/or off-gas from the reactor.

The second aspect of the present invention provides a method for upgrading solid material that includes the steps of:

(a) pressurising solid material and supplying pressurised solid material on a continuous or a semi-continuous basis to a reactor that is at elevated pressure and temperature conditions;

(b) controlling pressure and temperature conditions in the reactor and maintaining the reactor at elevated pressure and temperature and removing water from solid material; and (c) removing solid material from the reactor on a continuous or semi-continuous basis while maintaining elevated pressure and temperature conditions in the reactor and thereafter depressurising solid material and separating water as water vapor from the solid material and thereby cooling solid material.

The second aspect of the invention is characterised by operating on a continuous or semi-continuous basis. The prior art methods discussed above operate on a batch basis only.

Preferably step (b) includes controlling the pressure and temperature conditions in the reactor to be water saturation pressure conditions.

Preferably step (b) includes controlling the pressure and temperature conditions in the reactor via pressure generated by steam and other gas released from solid material in the reactor.

Preferably step (b) includes controlling the pressure and temperature conditions in the reactor so that there are minimal pressure fluctuations in the reactor.

Preferably step (b) includes controlling the pressure and temperature conditions in the reactor without pressure derived from a gas supply that is external to the reactor.

Preferably step (b) includes venting off-gas from the reactor and/or removing off-gas with solid material in step (c) in order to ensure that the pressure does not exceed a threshold pressure.

Preferably step (b) includes controlling the pressure and temperature conditions in the reactor by heating solid material in the reactor by indirect heat exchange.

The term "indirect heat exchange" as used herein refers to heat exchange processes in which the heat exchange fluid is separated from the solid material being heated by a physical barrier such as a wall of a tube.

Preferably the indirect heat exchange fluid is steam.

Preferably step (c) includes depressurising solid material removed from the reactor in a lockhopper or other suitable depressurising chamber.

The second aspect of the invention also provides an apparatus for upgrading solid material by removing water from solid material under elevated pressure and temperature conditions that includes:

(a) a reactor for holding solid material at elevated pressure and temperature conditions for removing water from the solid material;

(b) a means for controlling pressure and temperature conditions in the reactor;

(c) a means for supplying solid material under pressure to the reactor on a continuous or semi-continuous basis; and (d) a means for removing solid material from the reactor on a continuous or semi-continuous basis while maintaining elevated pressure and temperature conditions in the reactor and thereafter depressurising the removed solid material and separating water as water vapor from the solid material.

The following comments relate to both aspects of the invention.

Preferably the solid material does not include fines.

Preferably the solid material is a porous, water-containing, carbonaceous solid material, e.g. any rank coal, wood, biomass and the like.

More preferably the carbonaceous material is low rank coal.

The term "low rank coal" is understood to mean subbituminous and lignitic coals having less than 11,500 Btu/lb on a moist, mineral matter free basis. "Moist" is defined as "containing its natural inherent moisture but not including visible water on the surface of the coal". The foregoing definition is from ASTM D338-95 (Standard Classification of Coals by Rank).

Preferably the solid material has a particle size of minus 50 mm plus 4 mm.

More preferably the particle size is minus 37.5 mm plus 12.5 mm.

Preferably the average residence time of solid material in the reactor is less than 45 minutes when the method is operated on a continuous or a semi-continuous basis.

More preferably the residence time is less than 30 minutes.

Typically the residence time is less than 20 minutes.

It is preferred particularly that the residence time be 10–15 minutes.

In situations where the solid material is coal, typically water saturation pressure conditions are achieved with a pressure in the range of 0.8–150 bar and a temperature in the range of 200–650° F. (95–345° C.).

More preferably, with coal, water saturation pressure conditions are achieved with the pressure in the range of 15–85 bar and the temperature in the range of 390–570° F. (200–300° C.).

More preferably, with coal, water saturation pressure conditions are achieved with the pressure in the range of 35–55 bar and the temperature in the range of 460–520° F. (240–270° C.).

The invention also provides an upgraded solid material produced by the above-described methods.

Figure 1:
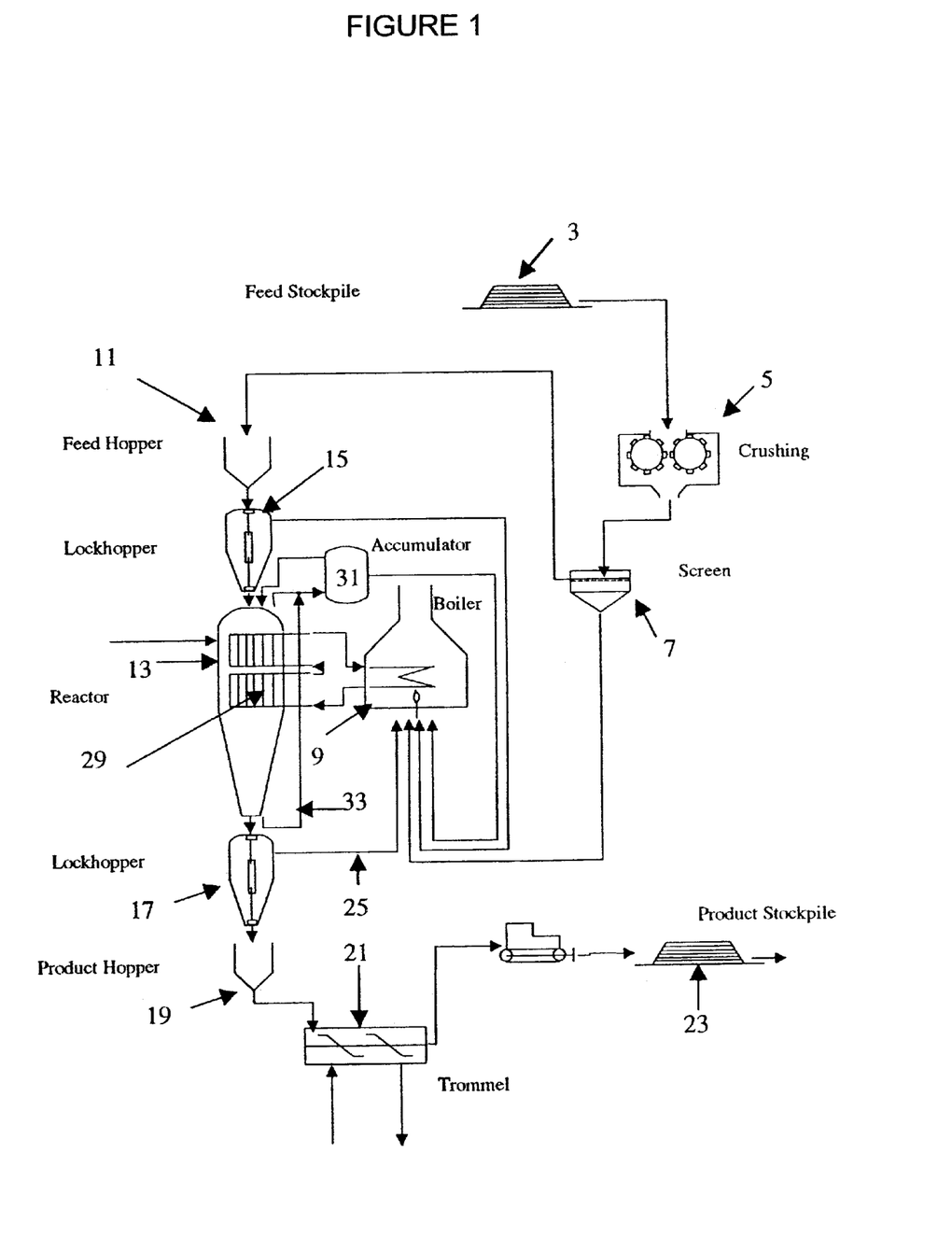
FIG. 1 is a flow sheet of one embodiment of method of this invention.

The invention is described further with reference to the accompanying drawing which is a FIG. 1 of a preferred embodiment of the invention.

The following description is in the context of upgrading low rank coal that typically contains 30% water by weight. It is noted that the invention is not limited to upgrading this particular solid material.

The following description is also in the context of a method and apparatus that operate on a semi-continuous basis. It is noted that the invention also extends to batch operation and continuous operation.

With reference to the FIG. 1, feed coal from a stockpile 3 is transferred to a crusher 5 and is crushed to break down over-size lumps.

The crushed coal is transferred to a screen 7 and fines are separated from the crushed coal.

The fines are transferred to a boiler 9 and are used as a heat source for the boiler.

In alternative flowsheets (i) the fines may be returned to the above feed processing circuit and the boiler may be fired by other energy sources, (ii) the fines may be blended with upgraded coal, and (iii) the fines may be processed by any combination of the foregoing options.

The crushed coal (minus the fines), which is typically minus 37.5 mm plus 12.5 mm, is transferred to a feed hopper 11 for a reactor assembly. The use of a sized coal feed enables reliable operation. Removing the fines improves:

(a) reactor heat transfer and therefore productivity;
(b) uniformity of processing;
(c) liquid drainage; and
(d) solids flow in the reactor.

The reactor assembly includes a reactor 13 which operates at water saturation pressure conditions, as described hereinafter, to remove water from large pores in coal in the reactor by the combined effect of heat and pressure.

The reactor assembly further includes a coal supply means in the form of an upper lockhopper 15 which supplies coal under pressure to an upper section of the reactor on a semi-continuous basis. The lockhopper is pressurised with an external gas supply and/or reactor offgas. The lockhopper includes an inlet that can receive coal from the feed hopper and an outlet which can supply coal to the upper section of the reactor 13. A typical sequence of operation includes transferring a charge of coal under gravity feed from the feed hopper 11 to the lockhopper 15 while the lockhopper outlet is closed, thereafter closing the lockhopper inlet and pressurising the lockhopper, and opening the lockhopper outlet and transferring pressurised coal into the upper section of the reactor.

The reactor assembly further includes a coal removal means in the form of a lower lockhopper 17 which removes solid material from a lower section of the reactor on a semi-continuous basis while maintaining water saturation pressure conditions in the reactor. The lockhopper includes an inlet connected to the lower section of the reactor 13 and an outlet that is positioned to supply depressurised coal to a product hopper 19. In a typical operating sequence, with the lockhopper outlet closed, the lockhopper inlet is opened and coal from the reactor moves under gravity feed into the lockhopper. The lockhopper inlet is then closed and the lockhopper is vented, thereby depressurising the lockhopper and flashing water from the coal in the lockhopper as a vapour. This has the effect of cooling the coal to a temperature of the order of 200° F.

The lockhopper 17 operates under water saturation conditions in order to ensure that the cooled coal retains a minimum amount, preferably 8 wt % water in the coal. In general terms, the objective of lockhopper operation is to remove most surface water and to reduce internal water to a lower level but not below a minimum level. In some situations, lockhopper operation may include the addition of water to the lockhopper to ensure that saturation conditions are maintained.

The cooled coal transferred from the lower lockhopper 17 to the product hopper 19 is transferred from the product hopper via a trommel 21 to a coal stock pile 23.

The vapour and other gases produced in the lower lockhopper are transferred via vent line 25 to the boiler 9 and are consumed in the boiler.

With the above-described arrangement coal supplied to the reactor 13 via the upper lockbopper 15 moves progressively down the reactor and is discharged from the reactor via the lower lockhopper 17. Typically the residence time of coal in the reactor is 15–35 minutes.

As indicated above, in overall terms, the supply and removal of coal to and from the reactor is on a semi-continuous basis.

As the coal moves down the reactor the water saturation pressure conditions in the reactor upgrade the coal by restructuring the coal and forcing water from pores, including fine pores, in the coal and thereby generating steam. In addition, the water saturation pressure conditions generate $CO_2$ and other gases.

Typically, water saturation pressure conditions are a pressure of 40 bar and a temperature of 480° F. (250° C.) in the reactor. By operating at water saturation pressure, heat transfer rates are inherently high and a "working fluid" relied on by the prior art processes discussed above is not required. Operating at water saturation pressure also means that steam can be used as a supply side indirect heat exchange fluid for controlling temperature in the reactor, as described hereinafter.

The reactor is always held at water saturation pressure. Essentially, the reactor is self-pressurising via the steam and other gases, such as $CO_2$, produced from upgrading coal in the reactor.

With further reference to the FIG. 1, the reactor assembly further includes a means for heating solid material in the reactor 13 which includes a means for controlling the pressure and temperature conditions in the reactor to maintain water saturation pressure conditions in the reactor.

The control means includes an indirect exchange circuit based on the use of condensing steam. The steam is generated in the boiler 9 and is passed through an assembly of a series of thin vertically disposed tubes 29 interconnected at upper and lower ends by manifolds.

The control means also includes an accumulator 31 connected to the reactor 13 to minimise pressure fluctuations in the reactor as a new charge of coal is supplied to the reactor via the upper lockhopper 15. A reactor vent stream 33 from a lower section of the reactor is passed through the accumulator 31 and a temperature control system within the accumulator maintains a pool of liquid at a temperature just below saturation. When a new charge of coal is supplied to the reactor 13 via the upper lockhopper 15 condensation on the cold feed typically results in a rapid drop of reactor pressure and therefore steam temperature. With the accumulator present, the pool of liquid boils off as soon as the pressure drops below the saturation pressure. This stabilises the reactor pressure and saturated steam temperature.

In an alternative fluid pressure fluctuations are minimised by connecting two or more reactors in parallel.

With the above arrangement, small increments of the total reactor charge can be fed into the reactor via the lockhoppers to reduce the impact of cold feed on the reactor temperature and pressure. The number of lockhopper cycles per reactor throughput can be optimised to give the best economic result, and produce consistent product.

The semi-continuous flow of coal through the reactor means that every particle sees a similar temperature history, which was not the case in the prior art processes known to the applicant.

Using lockhoppers also means that the rate of pressurisation and depressurisation can be controlled to optimise product quality.

Removing water as a vapour in the lower lockhopper 17 enables reliable operation of the reactor 13. In addition, it enables reliable operation of wastewater treatment equipment that is required to treat the water removed from the coal. In addition, it does not have a detrimental impact on product quality. By flashing the water remaining on the coal during lockhopper depressurisation, significant product cooling can be realised. This has a flow-on effect to product handling and storage where a cooled product is essential. Flash cooling the coal during depressurisation may also result in fewer organics being vaporised, further improving the quality of the waste streams.

The above-described water saturation pressure conditions, whilst elevated, are lower than prior art processes known to the applicant.

The benefits of operating at relatively low temperature, saturated conditions include:

(a) no "popcorn" formation ("popcorn" is brittle glassy product which is less desirable);

(b) a less dusty product;

(c) a product heating value in the range of 10,500–12,000 BTU/lb; and (d) shorter cycle times and increased productivity.

By operating at lower pressure and temperature, there is also an improvement in the quality of the waste water, which then has the potential for waste water treatment processes to be effective.

SPECIFIC EMBODIMENTS

In order to evaluate the above-described method, the applicant carried out a series of tests on a laboratory scale.

The laboratory scale tests were carried out on 0.75 lb (330 g) feed batches of coal.

The laboratory scale tests used equipment comprising a rapidly heated gas fired autoclave (to provide a source of steam) linked to a second autoclave in which the coal samples were contained in a wire basket. Pressure and temperature were logged during each test. The tests were carried out on a scale and under water saturation pressure conditions that enabled any heat transfer limitations in heating the coal to be avoided. At the same time, the batch size of the samples was large enough to obtain real effects of operating conditions on sizing and dusting. After a prescribed period of heating of the coal, the coal was cooled under water saturation conditions down to 100° C. and thereafter in atmosphere to ambient temperature.

The laboratory scale tests were performed to:
(a) make enough product to investigate the effect of saturated steam upgrading on product quality;
(b) examine the effect of depressurisation conditions on product degradation; and
(c) provide sufficient sample for NOX testing.

Table 1 is a summary of the results of the laboratory scale tests on two coal batches processed in accordance with the method of the invention. Table 1 also includes comparative data for raw coal.

tests with coil cooling. This difference is not evident in the waste water from the higher temperature tests.

The following observations are of interest:
(a) Heating was very even and rate of heat-up was rapid.
(b) No "popcorn" was observed in either higher temperature product.
(c) No noticeable fragmentation or degradation resulted from either flash or coil cooling.
(d) Noticeable shrinkage was noted in 480° F. material, which indicates that the product had been fully processed.
(e) Both higher temperature products contained little fines, and lower than usual dustiness.

In order to further evaluate the above-described method of the present invention, the applicant operated the method on a pilot plant scale.

The pilot plant processed 50 lb/hour Cordero coal on a continuous basis through a small-scale reactor having lockhopper inlet and outlet in accordance with the following procedure.

Feed to the Reactor

Raw coal was added to the feed lockhopper. When filled as required, the lockhopper was sealed and pressurised to a pressure 5–10 psi above the reactor pressure. When pressurised, a seal valve between the lockhopper and the reactor was opened and coal was allowed to fall into the reactor, with the aid of an external vibrator, and the seal valve was then closed.

Heating

The reactor was heated using a combination of 4×9 Kw and 1×15 kW electrical resistance heaters and a 30 kW steam generator.

TABLE 1

Summary of Small Scale Test Product Analysis

| Test Number | Moisture, % | Ash, % | Volatile Matter, % | Fixed Carbon, % | Calorific Value, BTU/lb | Calorific Value (Moisture Ash Free) BTU/lb | Dust Number |
|---|---|---|---|---|---|---|---|
| Raw coal | 21.1 | 4.8 | 55.3 | 18.8 | 9156 | 12356 | Not Tested |
| Saturated 410 F. Blend | 9.4 | 5.8 | 62.8 | 22.0 | 10580 | 12477 | 932 |
| Saturated 480 F. Blend | 7.1 | 5.7 | 53.8 | 33.4 | 10959 | 12568 | Not Tested |

All results on an "As received" basis

The results in Table 1 show that the higher temperature tests (410° F. and 480° F.) in accordance with the method of the invention resulted in lower product moisture and a corresponding higher calorific value.

A decrease in volatile matter in the higher temperature tests is also evident, indicative of some decarboxylation.

The waste water for each test was analysed. Higher total organic carbon and oil and grease were observed for the higher temperature tests, indicative of decarboxylation at the higher temperature. There appears to be a benefit from flash cooling in the 410° F. tests where the total organic carbon and oil and grease are significantly lower than the equivalent Product Discharge From the Reactor The product lockhopper was pressurised to a pressure 5–10 psi less than that of the reactor. When pressurised, a seal valve between the reactor and the lockhopper was opened and product was allowed to fall into the lockhopper, with the aid of an external vibrator. When filled as required, the seal valve was closed and the lockhopper was depressurised via a vent and a condenser. The product was discharged into a product bin.

Test conditions

A matrix of temperature and pressure and cycle times was evaluated.

Table 2 is a summary of the conditions.

| Temperature (° F.) | Pressure (psi$_g$) | Range of Cycle Times (minutes at T, P) | Feed Source | Feed Size (inches) |
|---|---|---|---|---|
| 460 | 467 | ~25–50 | Cordero | ½" × ¼" |
| 480 | 565 | ~15–90 | Cordero | ½" × ¼" |
| 495 | 650 | ~45–75 | Cordero | ½" × ¼" |

Product samples, representative of the range of operating conditions examined, were analysed for proximate and ultimate values. Selected samples were also analysed for equilibrium moisture and trace elements. A sample of process waste water was also analysed for its composition.

Moisture, Equilibrium Moisture and Calorific Value

Table 3 is a summary of typical feed and product analysis for Cordero coal tested.

| Sample ID | Feed Moisture % | Moisture (air dried) Ex-Reactor | Calorific Value Ex-Reactor, Btu/lb | Equilibrium Moisture (EM) % | Calorific Value at EM, Btu/lb |
|---|---|---|---|---|---|
| Typical Cordero Feed | 28.0 | — | 8627 | 28.0 | 8627 |
| Typical 460° F. Product | — | 8.0 | ~11130 | 15.5–17.0 | 10000–10200 |
| Typical 480° F. Product | — | 7.0–9.5 | 11100–11300 | 12–14 | 10380–10600 |
| Typical 495° F. Product | — | 7.0–9.5 | 11100–11300 | 11.5–12.5 | 10570–10700 |

The results show that the upgrading method removed moisture from the coal and produced a product of acceptable calorific value and moisture level.

Hardgrove Grindability

Hardgrove Grindability Index tests were performed on raw coal and product. Table 4 is a summary of the test results.

| Sample ID | Hardgrove Grindability Index |
|---|---|
| Typical Cordero Feed | 71 |
| Typical 460° F. Product | 67 |
| Typical 480° F. Product | 66–69 |
| Typical 495° F. Product | 73–75 |

The results show that the product had a very similar grindability to the raw coal. The similarity between the raw coal and the product indicates that the product retained its strength during processing and will be less likely to break down into smaller particles during handling, thereby lowering the risk of dust problems.

Process waste water

Table 5 is a summary of the results of analysis of waste water from a 480 F. trial.

| Continuous Reactor Process Water | Total Dissolved Solids | Total Suspended Solids | Total Organic Carbon | Total Phenols | Total Oil and Grease | Hg | Btu | PH |
|---|---|---|---|---|---|---|---|---|
| Mg/l* | 231 | 382 | 540 | 260 | 840 | <0.001 | — | 4.65 |
| Total Made (mg) | 3150 | 5209 | 7364 | 3545 | 11455 | | | |
| Mg/lb of feed | 43.8 | 72.3 | 102.3 | 49.2 | 159.1 | | | |
| Mg/kg of feed | 96.3 | 159.2 | 225.0 | 108.3 | 350.0 | | | |

The results indicate that the process waste water contained significant amounts of tar and dissolved solids.

Many modifications may be made to the preferred embodiment without departing from the spirit and scope of the present invention.

By way of example, whilst the preferred embodiment operates on a semi-continuous basis, the present invention is not so limited and extends to continuous operation and to batch operation (for the first aspect of the invention).

By way of further example, whilst the preferred embodiment includes controlling the temperature within the reactor using steam as an indirect heat exchange fluid, the present invention is not so limited and extends to any suitable temperature control means.

Although only a few embodiments of the present invention are described above in detail, those skilled in the art will appreciate that many additions and modifications can be made without departing from the spirit and scope of the invention. These and all other modifications are included within the scope of the present invention as described in the following claims.

What is claimed is:

1. A method for removing water from a porous, water-containing, carbonaceous, solid material, the method comprising the steps of:
    (a) supplying the material to a pressurization reactor;
    (b) heating the material in the reactor under water saturation pressure conditions such that water is removed from the material;
    (c) cooling the material by depressurizing the material under water saturation conditions to form water vapor from the removed water; and
    (d) separating the water vapor from the material.

2. The method of claim 1 wherein step (a) includes pressurizing the material and then supplying the pressurized material to the reactor on a continuous or a semi-continuous basis while maintaining the reactor under water saturation pressure conditions.

3. The method of claim 2 wherein step (a) includes pressurizing the material with an external gas supply and/or off-gas from the reactor.

4. The method defined in any of claims 1–3 wherein step (c) includes removing the material from the reactor on a continuous or a semi-continuous basis while maintaining the reactor under water saturation pressure conditions, and thereafter cooling the solid product.

5. The method defined in any of claims 1–3 wherein the water saturation pressure conditions, are a temperature between about 95–345° C. and a pressure between about 0.8–150 bar.

6. The method defined in any of claims 1–3 wherein step (c) includes cooling the material to a temperature of less than 110° C.

7. The method defined in any of claims 1–3 wherein the cooled solid material from step (c) has less than 12 wt % water.

8. The method defined in any of claims 1–3 wherein the cooled solid material from step (c) has less than 10 wt % water.

9. The method defined in any of claims 1–3 wherein the cooled solid material from step (c) has less than 8 wt % water.

10. The method defined in any of claims 1–3 wherein the cooled solid material from step (c) retains more than 5 wt % water.

11. The method defined in any of claims 1–3 wherein the cooled solid material from step (c) retains more than 6 wt % water.

12. The method defined in any of claims 1–3 wherein the cooled solid material from step (c) retains more than 7 wt % water.

13. The method defined in any of claims 1–3 wherein the average residence time of the material in the reactor is less than 45 minutes.

14. The method defined in any of claims 1–3 wherein the average residence time of the material in the reactor is less than 30 minutes.

15. The method defined in any of claims 1–3 wherein the average residence time of the material in the reactor is less than 20 minutes.

16. An apparatus for removing water from a porous, water-containing, carbonaceous, solid material under elevated pressure and temperature conditions, the apparatus comprising:
    (a) a reactor for holding the material at elevated pressure and temperature conditions;
    (b) a means for heating the material in the reactor under water saturation pressure conditions, which heating means includes a means for controlling pressure and temperature conditions in the reactor; and
    (c) a means for cooling the material by depressurizing the material under water saturation conditions.

17. The apparatus defined in claim 16 further including a means for supplying the material under pressure to the reactor on a continuous or semi-continuous basis.

18. The apparatus defined in claim 17 wherein the means for supplying the material under pressure to the reactor includes a lockhopper.

19. The apparatus defined in claim 18 wherein the lockhopper is connected to the reactor for supplying pressurized solid material to an upper section of the reactor.

20. The apparatus defined in any one of claims 16 to 19 wherein the means for controlling pressure and temperature conditions in the reactor includes an indirect heat exchange means for heating the material in the reactor.

21. The apparatus defined in claim 20 wherein the heat exchange fluid is steam and the indirect heat exchange means includes an assembly of a series of vertical heat exchange tubes, a horizontal manifold connected to upper ends of the tubes, and a horizontal manifold connected to lower ends of the tubes located in the reactor.

22. The apparatus defined in claim 21 wherein the means for controlling pressure and temperature conditions in the reactor includes a means for minimizing pressure fluctuations in the reactor as solid material is supplied to the reactor.

23. The apparatus defined in claim 22 wherein the means for minimizing pressure fluctuations includes an accumulator that holds a pool of liquid at a temperature just below saturation and is in fluid communication with the reactor.

24. The apparatus defined in any one of claims 16 to 19 wherein the means for cooling solid material includes a means for removing solid material from the reactor on a continuous or semi-continuous basis while maintaining water saturation pressure conditions in the reactor.

25. The apparatus defined in claim 24 wherein the cooling means includes a vent for flash cooling solid material.

26. The apparatus defined in claim 25 wherein the cooling means includes a lockhopper.

27. The apparatus defined in claim 26 wherein the lockhopper is connected to the reactor for removing solid material from a lower section of the reactor while maintaining water saturation conditions in the reactor.

28. A method for removing water from a porous, water-containing, carbonaceous, solid material, the method comprising the steps of:

(a) pressurizing the material and then supplying the pressurized material on a continuous or a semi-continuous basis to a reactor that is at elevated pressure and temperature conditions;

(b) controlling pressure and temperature conditions in the reactor and maintaining the reactor at elevated pressure and temperature while removing water from the material;

(c) removing the dewatered material from the reactor on a continuous or semi-continuous basis while maintaining elevated pressure and temperature conditions in the reactor; and (d) depressurizing the material, and thus separating water as water vapor from the material and thereby cooling the material.

29. The method defined in claim 28 wherein step (b) includes controlling the pressure and temperature conditions in the reactor at water saturation pressure conditions.

30. The method defined in claim 29 wherein step (b) includes controlling the pressure and temperature conditions in the reactor via pressure generated by steam and gases released from solid material in the reactor.

31. The method defined in claim 30 wherein step (b) includes controlling the pressure and temperature conditions in the reactor so that there are minimal pressure fluctuations in the reactor.

32. The method defined in any one of claims 28 to 31 wherein step (b) includes controlling the pressure and temperature conditions in the reactor without pressure derived from a gas supply that is external to the reactor.

33. The method defined in claim 32 wherein step (b) includes venting off-gas from the reactor and/or removing off-gas with solid material in step (c).

34. The method defined in claim 33 wherein step (b) includes controlling the pressure and temperature conditions in the reactor by heating the material in the reactor by indirect heat exchange.

35. The method defined in claim 34 wherein step (c) includes depressurizing the material removed from the reactor in a lockhopper or other suitable depressurizing chamber.

36. The method defined in claims 28 to 31 wherein the average residence time of solid material in the reactor is less than 45 minutes.

37. The method defined in claims 28 to 31 wherein the average residence time of solid material in the reactor is less than 30 minutes.

38. The method defined in claims 28 to 31 wherein the average residence time of solid material in the reactor is less than 20 minutes.

39. An apparatus for removing water from a porous, water-containing, carbonaceous, solid material under elevated pressure and temperature conditions, the apparatus comprising:

(a) a reactor for holding the material at elevated pressure and temperature conditions for removing water from the material;

(b) a means for controlling pressure and temperature conditions in the reactor, such means including an indirect heat exchange means for heating the material in the reactor;

(c) a lockhopper for supplying the material under pressure to the reactor on a continuous or semi-continuous basis, the lockhopper connected to the reactor such that pressurized material is supplied to an upper section of the reactor; and (d) a means for removing the material from the reactor on a continuous or semi-continuous basis while maintaining elevated pressure and temperature conditions in the reactor, and thereafter depressurizing the removed dewatered material to separate water as water vapor from the solid material and thereby cooling the solid material.

40. The apparatus defined in claim 39 wherein the heat exchange fluid is steam and the indirect heat exchange means includes an assembly of a series of vertical heat exchange tubes, a horizontal manifold connected to upper ends of the tubes, and a horizontal manifold connected to lower ends of the tubes located in the reactor.

41. The apparatus defined in claim 40 wherein the means for controlling pressure and temperature conditions in the reactor includes a means for minimizing pressure fluctuations in the reactor.

42. The apparatus defined in claim 41 wherein the means for minimizing pressure fluctuations includes an accumulator that holds a pool of liquid at a temperature just below saturation and is in fluid communication with the reactor.

43. The apparatus defined in claim 42 wherein the cooling means includes a vent for flash cooling the material.

44. The apparatus defined in claim 43 wherein the cooling means includes a lockhopper.

45. The apparatus defined in claim 44 wherein the lockhopper is connected to the reactor for removing the material from a lower section of the reactor while maintaining water saturation conditions in the reactor.

* * * * *